(12) United States Patent
Miyata et al.

(10) Patent No.: US 9,796,367 B2
(45) Date of Patent: Oct. 24, 2017

(54) VEHICLE BRAKE DEVICE

(71) Applicant: ADVICS CO., LTD., Kariya (JP)

(72) Inventors: Yoshihiro Miyata, Anjo (JP); Yasuhiro Hineno, Anjo (JP); Keita Nakano, Hamamatsu (JP); Takanori Iida, Chiryu (JP)

(73) Assignee: ADVICS CO., LTD., Kariya, Aichi-Pref. (JP)

( * ) Notice: Subject to any disclaimer, the term of this patent is extended or adjusted under 35 U.S.C. 154(b) by 48 days.

(21) Appl. No.: 14/349,555

(22) PCT Filed: Jan. 25, 2013

(86) PCT No.: PCT/JP2013/051568
§ 371 (c)(1),
(2) Date: Apr. 3, 2014

(87) PCT Pub. No.: WO2013/111849
PCT Pub. Date: Aug. 1, 2013

(65) Prior Publication Data
US 2014/0246897 A1   Sep. 4, 2014

(30) Foreign Application Priority Data

Jan. 25, 2012 (JP) .................................. 2012-013532
Mar. 30, 2012 (JP) .................................. 2012-082906

(51) Int. Cl.
*B60T 13/14* (2006.01)
*B60T 7/04* (2006.01)
(Continued)

(52) U.S. Cl.
CPC ............ *B60T 13/148* (2013.01); *B60T 7/042* (2013.01); *B60T 8/4872* (2013.01);
(Continued)

(58) Field of Classification Search
CPC .... B60T 13/145; B60T 13/146; B60T 13/686; B60T 8/4013; B60T 8/4072; B60T 8/4077; B60T 8/4081; B60T 8/4086
(Continued)

(56) References Cited

U.S. PATENT DOCUMENTS 3,744,856 A * 7/1973 Doversberger ....... B60T 13/141
 137/596.1
4,422,293 A * 12/1983 Ewald ................... B60T 13/145
 60/547.1

(Continued)

FOREIGN PATENT DOCUMENTS

CN    102887141 A    1/2013
CN    103328289 A    9/2013
(Continued)

OTHER PUBLICATIONS

International Search Report (PCT/ISA/210) dated Mar. 5, 2013, by the Japanese Patent Office as the International Searching Authority for International Application No. PCT/JP2013/051568.
(Continued)

*Primary Examiner* — Bradley King
*Assistant Examiner* — Stephen Bowes
(74) *Attorney, Agent, or Firm* — Buchanan Ingersoll & Rooney PC

(57) ABSTRACT

A vehicle brake device includes a hydraulic pressure generating device, a valve device, a pump and an accumulation section forming an accumulation chamber connected to a fluid passage between the valve device and the hydraulic pressure generating device or to a master chamber. A dead band is set in which the change of force of the magnitude corresponding to the hydraulic pressure in the master chamber does not substantially act on a brake operating member. A characteristic representing the relation between the pres-
(Continued)

sure and the brake fluid quantity in the accumulation chamber is set based on a characteristic representing the relation between the pressure and the brake fluid quantity in a wheel cylinder and the dead band so that, when brake fluid is flowing into and from the accumulation chamber, a force of the magnitude corresponding to the master chamber hydraulic pressure does not act on the brake operating member.

4 Claims, 10 Drawing Sheets

(51) Int. Cl.
    *B60T 13/66*         (2006.01)
    *B60T 13/68*         (2006.01)
    *B60T 8/48*          (2006.01)

(52) U.S. Cl.
    CPC .......... *B60T 13/141* (2013.01); *B60T 13/143* (2013.01); *B60T 13/146* (2013.01); *B60T 13/662* (2013.01); *B60T 13/686* (2013.01)

(58) Field of Classification Search
    USPC .......................................................... 138/31
    See application file for complete search history.

(56) References Cited

U.S. PATENT DOCUMENTS

| | | | | |
|---|---|---|---|---|
| 4,656,833 A | * | 4/1987 | Belart | B60T 8/32 303/10 |
| 4,732,001 A | * | 3/1988 | Belart | B60G 9/00 60/550 |
| 4,869,560 A | * | 9/1989 | Nishii | B60T 8/44 303/114.1 |
| 5,720,533 A | * | 2/1998 | Pastor et al. | 303/147 |
| 5,735,314 A | * | 4/1998 | Alaze | B60T 8/4068 138/31 |
| 6,412,882 B1 | * | 7/2002 | Isono | B60K 6/22 303/11 |
| 2008/0079309 A1 | * | 4/2008 | Hatano | B60T 8/4081 303/113.5 |
| 2008/0236971 A1 | * | 10/2008 | Suzuki | B60T 8/3655 188/358 |
| 2013/0024083 A1 | | 1/2013 | Jung | |
| 2013/0199364 A1 | * | 8/2013 | Weiberle | B60L 7/18 92/139 |
| 2013/0291535 A1 | | 11/2013 | Leiber et al. | |
| 2014/0180552 A1 | | 6/2014 | Giddens et al. | |

FOREIGN PATENT DOCUMENTS

| | | | | |
|---|---|---|---|---|
| CN | 103879392 A | | 6/2014 | |
| DE | 102010042694 A1 | * | 2/2012 | ................ B60L 7/18 |
| GB | 2093543 A | * | 9/1982 | ............ B60T 13/581 |
| JP | 07033002 A | * | 2/1995 | |
| JP | 11-20674 A | | 1/1999 | |
| JP | 2001-158339 A | | 6/2001 | |
| JP | 2009-286170 A | | 12/2009 | |

OTHER PUBLICATIONS

Notification of First Office Action dated Oct. 19, 2015 issued in the corresponding Chinese Patent Application No. 201380003452.9 and English language translation (19 pages).

* cited by examiner

VEHICLE BRAKE DEVICE

TECHNICAL FIELD

The present invention relates to a vehicle brake device boosted by a hydraulic pressure.

BACKGROUND ART

As booster devices in vehicle brake devices, there are one using a vacuum booster and another using a hydraulic pressure (oil pressure) booster. In the vacuum booster, the driving of a master piston is boosted by an air pressure in an assist chamber. In the hydraulic pressure booster, on the other hand, the driving of a master piston is boosted by an oil pressure (i.e., hydraulic pressure) in an assist chamber.

Further, in a vehicle brake device wherein a booster device varies the pressure generated in wheel cylinders, hydraulic pressure regulating means is provided between a master cylinder and the wheel cylinders. The hydraulic pressure regulating means performs an ABS (antilock control), a vehicle stability control, and a TCS (traction control).

Further, in a hybrid vehicle, the pressure in wheel cylinders is controlled so that an actual brake force being the sum of a regenerative brake force and a hydraulic brake force by the wheel cylinders becomes a target brake force set in correspondence to the operating force on a brake pedal. A vehicle brake control device is described in JP2009-286170A for example.

The pressure variation in the wheel cylinders can be performed by generating a pressure difference between the pressure in the wheel cylinders (wheel pressure) and the pressure in the master cylinder (mater pressure) by the use of, for example, a valve device adjustable in flow pass resistance and a pump. That is, the wheel pressure can be controlled to be higher than the master pressure by making the pump discharge the brake fluid on the master cylinder side with respect to the valve device toward the wheel cylinder side with respect to the valve device while the valve device controls the flow of brake fluid between the master cylinder and the wheel cylinders, and the wheel pressure can be controlled to substantially the same hydraulic pressure as the master pressure by making the valve device release the flow of brake fluid between the master cylinder and the wheel cylinders.

PRIOR ART DOCUMENT

Patent Document

Patent Document 1: JP2009-286170 A

SUMMARY OF THE INVENTION

Problem to be Solved by the Invention

However, in controlling the wheel pressure as aforementioned above, there arise a problem that the controllability is degraded and another problem that a large fluctuation occurs in a reaction force to a brake operating member as well as in the stroke of the brake operating member.

The present invention has been made taking the foregoing circumstances into consideration, and an object thereof is to provide a vehicle brake device which is enhanced in the controllability of wheel pressure and which suppresses the fluctuation in a reaction force to a brake operating member and the fluctuation in the stroke of the brake operating member.

Solution to the Problem

A vehicle brake device according to a first aspect of the present invention comprises a hydraulic pressure generating device (2) in which with an operation on a brake operating member, a master piston (21, 22) is slid relative to a master cylinder (20) to generate a hydraulic pressure corresponding to the operation on the brake operating member in a master chamber (2A); a valve device (51) that is provided on a flow passage for brake fluid between the hydraulic pressure generating device and a wheel cylinder (4) and that controls the flow of the brake fluid between the hydraulic pressure generating device and the wheel cylinder; a pump (54) that discharges the brake fluid on the hydraulic pressure generating device side with respect to the valve device toward the wheel cylinder side with respect to the valve device; and an accumulation section (2A, 9, 8) that forms an accumulation chamber (2A, 8A) connected to a portion between the valve device and the hydraulic pressure generating device of the fluid passage for the brake fluid or to the master chamber; wherein a dead band is set that, when the change of the hydraulic pressure in the master chamber acting on the master piston is smaller than a predetermined value, makes the change of an operating force on the brake operating member relative to the change of the hydraulic pressure in the master chamber not act substantially on the brake operating member; and wherein a characteristic representing the relation between the hydraulic pressure and the fluid quantity of the brake fluid in the accumulation chamber is set based on a characteristic representing the relation between the hydraulic pressure and the fluid quantity of the brake fluid in the wheel cylinder and the dead band so that, when brake fluid is flowing into or from the accumulation chamber, a force of the magnitude corresponding to the hydraulic pressure in the master chamber acting on the master piston does not act on the brake operating member. The "not act substantially" in the dead band means a concept that includes not acting utterly and suppressing the acting (or acting while being suppressed).

The vehicle brake device according to a second aspect of the present invention is such that in the aforementioned first aspect, the characteristic representing the relation between the hydraulic pressure and the fluid quantity of the brake fluid in the accumulation chamber is set based on a tolerable value for the difference between an actual brake force and a target brake force when the valve device is operated.

A vehicle brake device according to a third aspect of the present invention comprises a hydraulic pressure generating device (2) in which a master piston (21, 22) driven by an output member (32) moved with an operation on a brake operating member is slid relative to a master cylinder (20) to generate a hydraulic pressure corresponding to the operation on the brake operating member in a master chamber (2A); a valve device (51) that is provided on a passage for brake fluid between the hydraulic pressure generating device and a wheel cylinder (4) and that controls the flow of the brake fluid between the hydraulic pressure generating device and the wheel cylinder; a pump (54) that discharges the brake fluid on the hydraulic pressure generating device side with respect to the valve device toward the wheel cylinder side with respect to the valve device; and an absorbing section (9) that is arranged between the master piston and the output member and that is constructed to have an elastic deformation member (91) elastically deformed by a force of the magnitude corresponding to the hydraulic pressure in the master chamber; wherein a dead band is set that, when the change of the hydraulic pressure in the master chamber acting on the master piston is smaller than a predetermined value, makes the change of an operating force on the brake operating member relative to the change of the hydraulic pressure in the master chamber not act substantially on the brake operating member; and wherein the elastic modulus of the elastic deformation member is set based on a characteristic representing the relation between the hydraulic pressure and the fluid quantity of the brake fluid in the wheel cylinder and the dead band so that, when the elastic deformation member is being elastically deformed by a force of the magnitude corresponding to the hydraulic pressure in the master chamber, the force acting on the output member does not act on the brake operating member. The "not act substantially" in the dead band means a concept that includes not acting utterly and suppressing the acting (or acting while being suppressed).

The vehicle brake device according to a fourth aspect of the present invention comprises, in the aforementioned first or second aspect, a booster device (3) that generates a fluid pressure corresponding to the operating force acting on the brake operating member in an assist chamber to apply a force corresponding to the fluid pressure in the assist chamber to the master piston; wherein a boosting ratio of the booster device is made to be larger when the hydraulic pressure in the master chamber is lower than a predetermined pressure in comparison with the boosting ratio when the hydraulic pressure in the master chamber is equal to or higher than the predetermined pressure, so that the dead band is set within a range of the hydraulic pressure in the master chamber being lower than the predetermined pressure.

A vehicle brake device according to a fifth aspect of the present invention comprises a hydraulic pressure generating device (2) in which with an operation on a brake operating member, a master piston (21, 22) is slid relative to a master cylinder (20) to generate a hydraulic pressure corresponding to the operation on the brake operating member in a master chamber (2A); a booster device (3) that generates a fluid pressure corresponding to an operating force acting on the brake operating member in an assist chamber (3A) to apply a force corresponding to the fluid pressure in the assist chamber to the master piston; a valve device (51) that is provided on a flow passage for brake fluid between the hydraulic pressure generating device and a wheel cylinder (4) and that controls the flow of brake fluid between the hydraulic pressure generating device and the wheel cylinder; a pump (54) that discharges the brake fluid on the hydraulic pressure generating device side with respect to the valve device toward the wheel cylinder side with respect to the valve device; and an accumulation section (2A, 9, 8, 80) that forms an accumulation chamber (2A, 8A, 80A) connected to at least one of a portion between the valve device and the hydraulic pressure generating device of the flow passage for the brake fluid, the master chamber and the assist chamber; wherein a dead band is set that, when the change of the hydraulic pressure in the master chamber acting on the master piston is smaller than a predetermined value, makes the change of the operating force on the brake operating member relative to the change of the hydraulic pressure in the master chamber not act substantially on the brake operating member; and wherein a characteristic representing the relation between the hydraulic pressure and the fluid quantity of the brake fluid in the accumulation chamber is set based on a characteristic representing the relation between the hydraulic pressure and the fluid quantity of the brake fluid in the wheel cylinder and the dead band so that, when the brake fluid is flowing into or from the accumulation chamber, the change of the hydraulic pressure in the master chamber acting on the master piston is suppressed. The "not act substantially" in the dead band means a concept that includes not acting utterly and suppressing the acting (or acting while being suppressed).

The vehicle brake device according to a sixth aspect of the present invention is such that in any one of the aforementioned first, second, fourth and fifth aspects, the accumulation section is constituted by a damper having an elastic deformation member.

The vehicle brake device according to a seventh aspect of the present invention is such that in any one of the aforementioned first, second, fourth, fifth and sixth aspects, the accumulation section has a flow passage forming portion that forms a flow passage for brake fluid between the accumulation section and a portion between the valve device and the hydraulic pressure generating device of the flow passage for the brake fluid, between the accumulation section and the master chamber or between the accumulation section and the assist chamber and that a throttle portion is provided on the flow passage forming portion.

The vehicle brake device according to an eighth aspect of the present invention comprises, in the aforementioned third aspect, a booster device (3) that generates a fluid pressure corresponding to the operating force acting on the brake operating member in an assist chamber to apply a force corresponding to the fluid pressure in the assist chamber to the master piston; wherein a boosting ratio of the booster device is made to be larger when the hydraulic pressure in the master chamber is lower than a predetermined pressure in comparison with the boosting ratio when the hydraulic pressure in the master chamber is equal to or higher than the predetermined pressure, so that the dead band is set within a range of the hydraulic pressure in the master chamber being lower than the predetermined pressure.

Effects of the Invention

According to the vehicle brake device in the aforementioned first aspect of the present invention, by the accumulation section that is designed based on the characteristic representing the relation between the hydraulic pressure and the fluid quantity of the brake fluid in the wheel cylinder and the dead band, it is possible to suppress the fluctuation in the master pressure and the fluctuation in the brake fluid quantity in the master chamber in raising or lowering the wheel pressure. That is, in discharging the brake fluid on the master cylinder side with respect to the valve device toward the wheel cylinder side by the pump to raise the wheel pressure, the brake fluid in the accumulation chamber is made to be supplied to the pump, and hence, it is possible to suppress the drop of the master pressure and the decrease of the brake fluid quantity in the master chamber. Further, in making the brake fluid flow from the wheel cylinder side toward the master cylinder side through the valve device to lower the wheel pressure, the brake fluid flows into the accumulation chamber, and hence, it is possible to suppress the rise of the master pressure and the increase of the brake fluid quantity in the master chamber. Accordingly, in the present invention, the fluctuation in the master pressure can be suppressed, so that it is possible to enhance the controllability of the wheel pressure and to suppress the fluctuation in the reaction force to the brake operating member and the fluctuation in the stroke of the brake operating member.

Specifically, in raising the wheel pressure as mentioned above, if the stroke amount of the brake operating member is kept by the driver, the master pressure tends to drop thereby causing the rise of the wheel pressure to become insufficient and causing the reaction force to the brake operating member to lower. In the present invention, however, because the drop of the master pressure is suppressed as mentioned above, it is possible to enhance the controllability in raising the wheel pressure and, at the same time, to suppress the lowering of the reaction force to the brake operating member.

On the other hand, if the operating force on the brake operating member is kept by the driver, the brake fluid quantity in the master chamber tends to decrease thereby causing the stroke amount of the brake operating member to increase. In the present invention, because the decrease of the brake fluid quantity in the master chamber is suppressed as aforementioned, it is possible to suppress an increase in the stroke amount.

Further, in lowering the wheel pressure as mentioned above, if the stroke amount of the brake operating member is kept by the driver, the master pressure tends to increase thereby causing the lowering of the wheel pressure to be insufficient and causing the reaction force to the brake operating member to increase. In the present invention, because the increase of the master pressure is suppressed as mentioned above, it is possible to enhance the controllability in lowering the wheel pressure and, at the same time, to suppress the increase in the reaction force to the brake operating member.

On the other hand, if the operating force on the brake operating member is kept by the driver, the brake fluid quantity in the master chamber tends to increase thereby causing the stroke amount of the brake operating member to decrease. In the present invention, the increase of the brake fluid quantity in the master chamber is suppressed as aforementioned above, it is possible to suppress the decrease of the stroke amount.

According to the vehicle brake device in the aforementioned second aspect of the present invention, it is possible to make the difference between the actual brake force and the target brake force come within the tolerable value.

According to the vehicle brake device in the aforementioned third aspect of the present invention, the absorbing section and the master chamber correspond to the accumulation section in the aforementioned first aspect to perform the same function, so that the same effects as those in the aforementioned first aspect can be achieved.

According to the vehicle brake device in the aforementioned fourth or eighth aspect of the present invention, in a master pressure region at the time of the ordinary use, the fluctuation in the master pressure and the fluctuation in the brake fluid quantity in the master chamber can be suppressed in raising or lowering the wheel pressure, so that the wheel pressure can reliably be controlled to a desired pressure. Where the master pressure is high as is the case of an urgent braking, it is possible to make the wheel pressure increase with a good follow-up property.

According to the vehicle brake device in the aforementioned fifth aspect of the present invention, the same effects as those in the aforementioned first aspect can be achieved, and where the accumulation section is provided for the assist chamber, the shock occurring with the supply of the brake fluid to the assist chamber can be absorbed, so that it is possible to suppress the shock to the passenger and the shock noise.

According to the vehicle brake device in the aforementioned sixth aspect of the present invention, the accumulation section can easily be configured as a small damper mechanism by the use of the elastic deformation member. Further, the adjustment of the damper effect becomes easy by the change in setting the elastic modulus or the like of the elastic deformation member.

According to the vehicle brake device in the aforementioned seventh aspect of the present invention, since the throttle portion is provided on the flow passage forming portion, the fluid in the flow passage forming portion is restrained from flowing rapidly. Thus, at the time of a quick stepping on the brake operating member like, for example, a quick braking, the throttling effect by the throttle portion can be performed sufficiently, and the brake fluid is restrained from flowing toward the accumulation section side, so that it is possible to raise the master pressure and the wheel pressure properly. On the other hand, at the time of adjusting the wheel pressure, because the flow of the brake fluid is slow, the throttling effect by the throttle portion is small, and the brake fluid flows toward and away from the accumulation section side as does in the case of the aforementioned first aspect, so that it is possible to control the wheel pressure properly.

EMBODIMENTS FOR PRACTICING THE INVENTION

Figure 1:
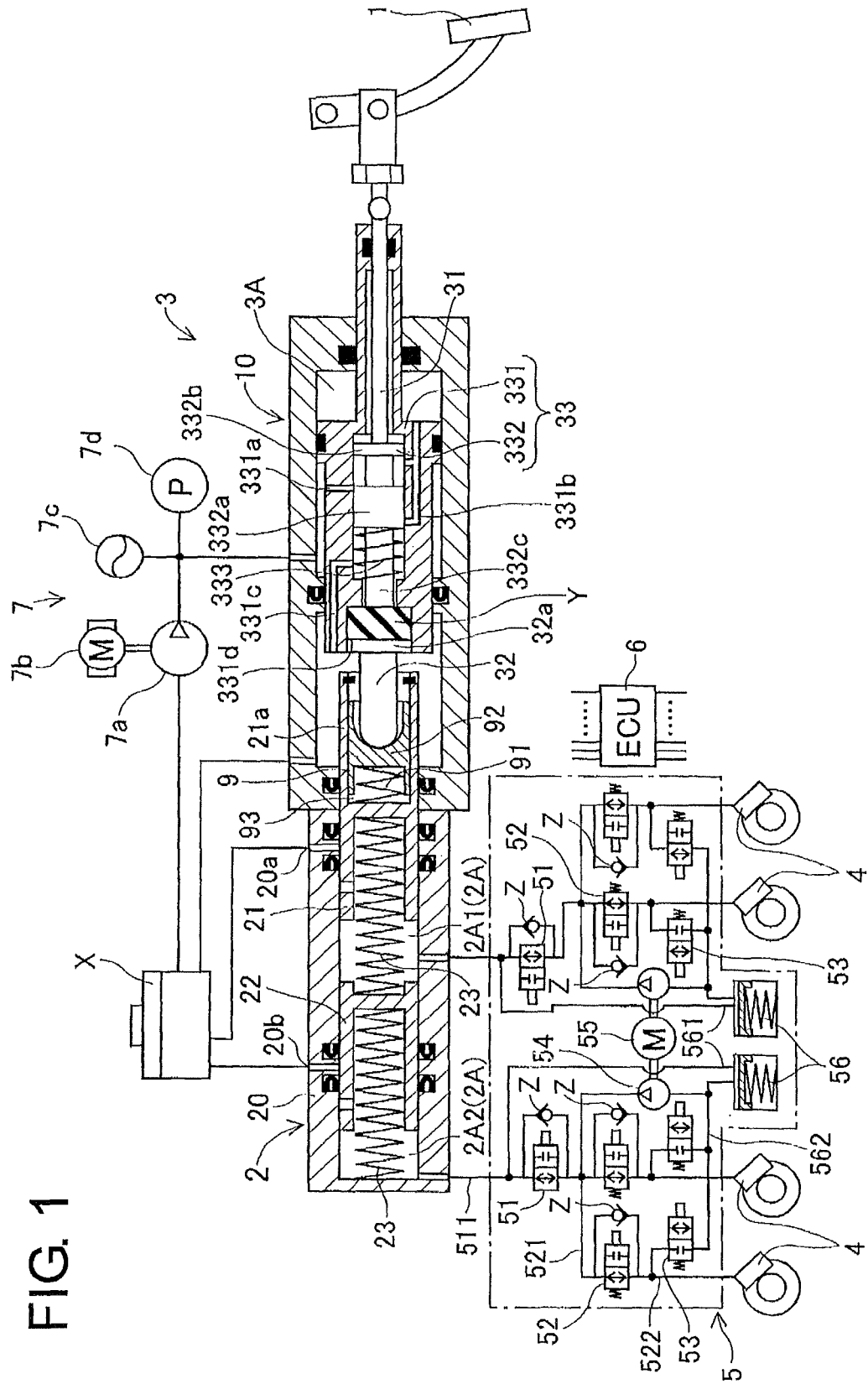
FIG. 1 is an explanatory view partly in section showing the construction of a vehicle brake device in a first embodiment.

Next, the present invention will be described in greater detail based on embodiments. In the respective embodiments described hereinafter, those parts that are mutually identical or equivalent will be given the same reference numerals in the figures.

First Embodiment

As shown in FIG. 1, a vehicle brake device in a first embodiment is provided with a brake pedal 1 (corresponding to "brake operating member"), a booster housing 10, a hydraulic pressure generating device 2, a booster device 3, wheel cylinders 4, a hydraulic control device 5, a brake ECU 6, a hydraulic pressure source 7, various sensors (not shown) that communicate with the brake ECU 6, and a hybrid ECU (not shown). In the description, the direction (leftward direction in FIG. 1) in which master pistons 21, 22 referred to later are driven by the stepping of the brake pedal 1 is regarded as "forward direction", and the opposite direction thereto (rightward direction in FIG. 1) is regarded as "backward direction".

The hydraulic pressure generating device 2 is provided with a master cylinder 20, a first master piston 21, a second master piston 22, return springs 23, and a reservoir X. The master cylinder 20 is connected to a forward end side portion of the booster housing 10. The master cylinder 20 is the same as a well-known tandem master cylinder, and the detailed description thereof will be omitted.

In the master cylinder 20, a "first master chamber 2A1" is formed (defined) by an internal surface of the master cylinder 20, a forward end side portion of the first master piston 21 and a backward end side portion of the second master piston 22. Similarly, in the master cylinder 20, a "second master chamber 2A2" is formed (defined) by the internal surface of the master cylinder 20 and a forward end side portion of the second master piston 22. The hydraulic pressure generating device 2 generates a hydraulic pressure in the master chambers 2A as the master pistons 21, 22 are slid relative to the master cylinder 20. Hereinafter, the first master chamber 2A1 and the second master chamber 2A2 will be referred to collectively as master chambers 2A.

The master pistons 21, 22 each take a bottomed cylindrical shape opening on the forward side and are urged by the return springs 23 in the backward direction. The first master piston 21 is formed with a tubular portion 21a extending from its backward side end portion in the backward direction. The reservoir X is connected to ports 20a, 20b of the master cylinder 20. The reservoir X and the master chambers 2A are in communication when the master pistons 21, 22 are at the initial positions.

The hydraulic pressure source 7 is provided with a pump 7a connected to the reservoir X, a motor 7b for driving the pump 7a, an accumulator 7c and a pressure sensor 7d. The hydraulic pressure source 7 makes the motor 7b turn on or turn off based on the detected pressure of the pressure sensor 7d and maintains the hydraulic pressure stored in the accumulator 7c within upper and lower limit values.

The booster device 3 is arranged in the booster housing 10 and is provided with an input rod 31, an output member 32 and a pressure regulating section 33. The booster device 3 is a device that supplies a hydraulic pressure to an assist chamber 3A referred to later from the hydraulic pressure source 7 in dependence on the operation of the brake pedal 1.

The input rod 31 is connected to the brake pedal 1 at its backward end side portion and is moved back and forth in dependence on the operating amount or operating force of the brake pedal 1. The output member 32 is arranged at a forward end side portion of a reaction force application member Y referred to later and is advanced in dependence on the forward movement of a boost piston 331 referred to later.

The pressure regulating section 33 is provided with the boost piston 331 and a spool valve 332. The boost piston 331 takes an almost tubular shape and receives the input rod 31, the spool valve 332 and the reaction force application member Y therein. The boost piston 331 defines the assist chamber 3A on the backward side in the booster housing 10. That is, on the backward side of the boost piston 331, the assist chamber 3A is formed by the boost piston 331 and the internal surface of the booster housing 10.

The boost piston 331 is provided with passages 331a, 331b and 331c. The passage 331a is a passage that makes the hydraulic pressure source 7 communicate with the interior of the boost piston 331. The passage 331b is a passage that makes the assist chamber 3A communicate with the interior of the boost piston 331. The passage 331c is a passage that makes the reservoir X communicate with the interior of the boost piston 331.

The spool valve 332 has portions (large-diameter portions) 332a and 332b being larger in diameter than the input rod 31 and opens or closes the respective passages 331a to 331c by sliding the relative positions to the boost piston 331 of the large-diameter portions 332a, 332b back and forth. The spool valve 332 is connected to the input rod 31 and is slid in dependence on the forward and backward movements of the input rod 31. The boost piston 331 is formed with a large-diameter bottomed hole 331d opening at the forward end side surface, and the reaction force application member Y is arranged in the large-diameter hole 331d. A small-diameter portion 332c formed at the forward side end portion of the spool valve 332 slidably passes through a bottom portion of the large-diameter hole 331d and is in contact with the reaction force application member Y.

In the pressure regulating section 33, when the input rod 31 is advanced relative to the boost piston 331 by the stepping of the brake pedal 1 to move the large-diameter portion 332 forward a predetermined amount, the passage 331a is opened to bring the hydraulic pressure source 31 and the assist chamber 3A into communication. Thus, high-pressure brake fluid flows into the assist chamber 3A. The pressure regulating section 33 supplies the high-pressure fluid to the assist chamber 3A in dependence on the operation of the brake pedal 1. When the assist chamber 3A rises at a high pressure, the boost piston 331 is advanced to move the output member 32 forward. The output member 32 is connected on the forward side to the first master piston 21 through an absorbing section 9. The forward side end portion of the output member 32 is arranged in the tubular portion 21a. A large-diameter portion 32a formed on the backward side of the output member 32 is slidably fitted in the large-diameter hole 331d opening at the forward side end surface of the boost piston 331 and is in contact with the reaction force application member Y. In the state that the input rod 31 and the spool valve 332 are returned by a return spring 333 to the most retracted position, the passages 331b, 331c are opened, wherein the assist chamber 3A and the reservoir X are in communication.

The reaction force application member Y is a well-known member made of a rubber disc and is one for producing a reaction force in dependence on the brake operating amount. Assuming that the area of the master chambers 2A in the master cylinder 20 is taken as Am, that the area of the assist chamber 3A is taken as As, that the area of the small-diameter portion 332c of the spool valve 332 being in contact with the reaction application member Y is taken as Ar, and that the area of the large diameter portion 332a of the output member 32 being in contact with the reaction force application member Y is taken as Ao, the relation between the hydraulic pressure (master pressure) Pm in the master chambers 2A and the operating force F acting on the input rod 31 becomes Pm=(F/Am)×(Ao/Ar).

The absorbing section 9 is arranged between the first master piston 21 and the output member 32. The absorbing section 9 is provided with an elastic deformation member 91 that is elastically deformed by a force of the magnitude corresponding to the hydraulic pressure in the master chamber 2A, and a plunger 92 of a bottomed tubular shape being in contact with the output member 32 on the backward side and opening on the forward side. For example, the elastic deformation member 91 is a compression spring that is compressed in advance by being held in contact with the first master piston 21 at one end (forward end) thereof and in contact with the plunger 92 at the other end (backward end) thereof.

The plunger 92 and the rear end surface of the first master piston 21 are separated by a predetermined distance in the axial direction. That is, a separation area 93 is formed by the plunger 92 and the first master piston 21. Although the plunger 92 is advanced relative to the first master piston 21 in dependence on the forward movement of the output member 32, the elastic deformation member 91 has a spring constant (elastic modulus) set so that within a range of the hydraulic pressure (in the degree of 2 MPa) which is generated in the master chamber 2A by the operating force used usually on the brake pedal 1 except for a quick braking or the like, the separation area 93 is not exhausted by the relative movement between the plunger 92 and the first master piston 21. That is, in the usual braking operation, the output member 32 is advanced by the pressure in the assist chamber 3A, and the first master piston 21 is advanced with the elastic deformation member 91 shortened a little and with the separation area 93 remaining.

The hydraulic control device 5 is arranged between the master cylinder 20 and the wheel cylinders 4 and adjusts the hydraulic pressure (master pressure) supplied from the master chambers 2A based on a command from the brake ECU 6 to supply the adjusted pressure to the wheel cylinders 4. For example, when the brake force depending only on a base brake force, which is generated by a master pressure (base hydraulic pressure) only supplied to the wheel cylinders 4, and a regenerative brake force is insufficient, the hydraulic control device 5 generates a controlled hydraulic pressure corresponding to a deficiency of the brake force (controlled brake force) and supplies the wheel cylinders 4 with the generated controlled hydraulic pressure in addition to the base hydraulic pressure to make the wheel cylinders 4 generate a wheel pressure. The hydraulic control device 5 performs other controls of various kinds. For example, in an ABS, the hydraulic control device 5 is able to control the wheel pressure by retaining, increasing or reducing the pressure supplied from the master chambers 2A.

The hydraulic control device 5 is provided with valve devices 51, pressure increase valves 52, pressure reducing valves 53, pumps 54, a motor 55 and reservoirs 56. The valve devices 51 are normally-open solenoid valves and are connected to pipes 511 connected to the master chambers 2A. Each valve device 51 is a solenoid valve that is controllable to a communication state (non-electrified state) and a differential pressure state, and is able to vary the differential pressure state between the wheel pressure and the master pressure in dependence on the current value of electric current flowing through its own solenoid in the driving state of the pump 54. The larger the electric current value is, the larger the differential pressure amount becomes. Like this, each valve device 51 is a valve that controls the flow of the brake fluid between the hydraulic pressure generating device 2 and the wheel cylinders 4.

Each pressure increase valve 52 is a normally-open solenoid valve that is connected to the valve device 51 and the pump 54 through a pipe 521 on the upstream side (master chamber 2A side) and that is connected to the wheel cylinder 4 through a pipe 522 on the downstream side (wheel cylinder 4 side). That is, the brake fluid from the master chamber 2A is supplied to the wheel cylinder 4 through the valve device 51 and the pressure increase valve 52. Each pressure increase valve 52 is a two-position valve that is controllable to a communication state and a cut-off state. Each pressure increase valve 52 is in the communication state during the usual braking operation. Further, each pressure increase valve 52 and each valve device 51 are respectively provided with safety valves Z in parallel thereto.

Each pressure reducing valve 53 is a normally-closed solenoid valve that is connected to the pipe 522 on one side and to the reservoir 56 and the pump 54 on the other side. Each pressure reducing valve 53 is constituted as a two-position valve that is controllable to a communication state and a cut-off state. Each pressure reducing valve 53 is in the cut-off state during the usual braking operation.

Each pump 54 is a pump that is connected to the reservoir 56 and the pressure reducing valves 53 on a suction side and to the pipe 521 (the downstream side of valve device 51 and the upstream side of the pressure increase values 52) on a discharge side. Each pump 54 is driven by the motor 54. The motor 54 is controlled by the brake ECU 6 to an ON or OFF state. Each reservoir 56 is connected to the master chamber 2A through a pipe 561 and is connected to the pump 54 and the pressure reducing valves 53 through a pipe 562.

The control of the hydraulic control device 5 is performed by a well-known method. Briefly, the hydraulic control device 5 controls the flow of the brake fluid between the master cylinder 20 and the wheel cylinders 4 by the valve devices 51 and, in that state, causes the pumps 54 to discharge the brake fluid on the master cylinder 20 side with respect to the valve devices 51 toward the wheel cylinder 4 side with respect to the valve devices 51 to control the wheel pressure to a higher hydraulic pressure than the master pressure. Further, the hydraulic control device 5 causes the valve devices 51 to release the flow of the brake fluid between the master cylinder 20 and the wheel cylinders 4 to control the wheel pressure and the master pressure to substantially the same hydraulic pressure.

In the hybrid vehicle, the brake force is the sum of a hydraulic brake force that depends on the wheel pressure made by adding a controlled hydraulic pressure to a master pressure, and a regenerative brake force. Thus, when the brake pedal 1 is operated, the brake ECU 6 calculates a total brake force depending on the brake operating amount, then calculates a controlled brake force that is made by subtracting from the total brake force a base brake force and a regenerative brake force transmitted from the hybrid ECU, and controls the hydraulic control device 5 to generate a controlled hydraulic pressure corresponding to the controlled brake force.

Figure 2:
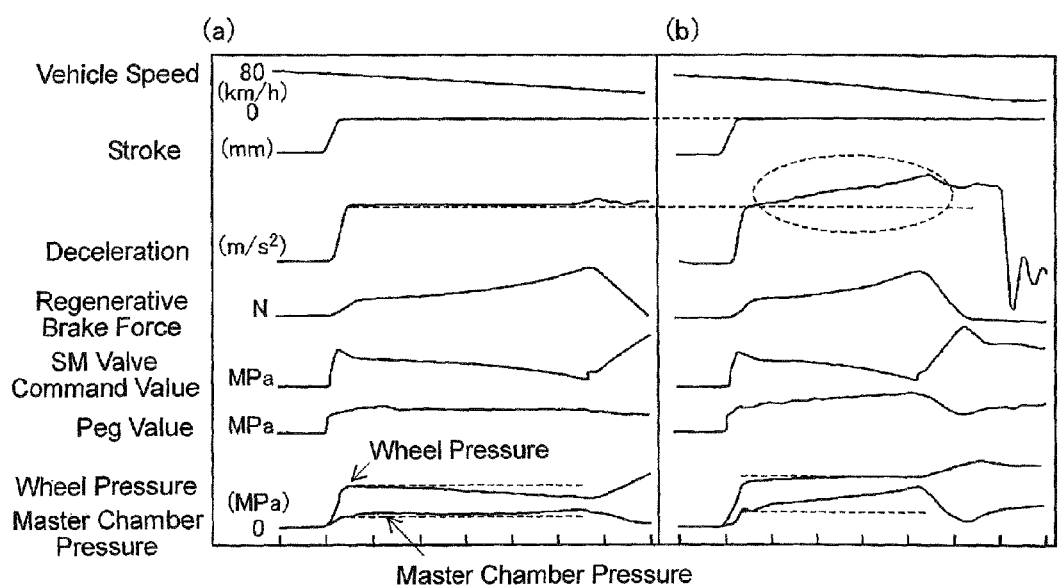
FIG. 2 is an explanatory chart showing the relation between brake operating amount and actual brake force.

For example, as shown in FIG. 2, when the brake pedal 1 is stepped, the base brake force depending on the master pressure and the regenerative brake force are generated. Then, where the brake force is insufficient as far as it relies on the base brake force and the regenerative brake force only, the hydraulic control device 5 generates the controlled hydraulic pressure by throttling the fluid passages by the valve devices 51 and by discharging the brake fluid from the pumps 54. At this time, in order to maintain the total brake force (deceleration) corresponding to the brake operating amount (stroke), the wheel pressure is controlled in dependence on an increase or decrease in the regenerative brake force. That is, the brake ECU 6 controls the wheel pressure by controlling the throttling of the valve devices 51.

Heretofore, as shown in FIG. 2 (*b*), in a hydraulic brake device that is not provided with the absorbing section 9, there occurs a phenomenon that even if the throttling of the valve devices 51 is released in order to reduce the wheel pressure, the wheel pressure is not reduced. This is because, even when the brake fluid outflowing from the wheel cylinders 4 flows into the master chambers 2A through the valve devices 51 for reduction in the wheel pressure, the boost piston 331 and hence the master pistons 21, 22 are hardly retracted due to the brake fluid (incompressible fluid) being in the assist chamber 3A, resulting in an increase in the master pressure. As a consequence, the hydraulic brake force does not change, and the total brake force is increased in correspondence to an increase in the regenerative brake force, whereby the deceleration becomes large.

In the present embodiment, the absorbing section 9 is provided, and therefore, when the brake fluid flows backward (is pumped back) from the pumps 54 to the master chambers 2A, the elastic deformation member 91 is shortened, and the master pistons 21, 22 are allowed to retract by the length of the separation area 93 remaining. That is, the absorbing section 9 absorbs a pressure increase action in the master pressure (the inflow of the brake fluid from the wheel cylinders 4), whereby, as shown in FIG. 2(*a*), it becomes possible to suppress an increase in the master pressure and to reduce the wheel pressure.

Further, when the hydraulic control device 5 increases the wheel pressure by causing the pumps 54 to discharge the brake fluid on the master cylinder 20 side with respect to the valve devices 51 toward the wheel cylinder 4 side, the master pistons 21, 22 are pushed forward by the urging force of the elastic deformation member 91 in the absorbing section. Thus, it is possible to suppress a drop in the master pressure and a decrease in the brake fluid quantity in the master chambers 2A.

That is, when the stroke amount of the brake pedal 1 is kept by the driver in increasing the wheel pressure, the master pressure tends to drop thereby resulting in a deficiency in the increase of the wheel pressure, and the reaction force to the brake pedal 1 tends to lower. However, in the present embodiment, because the drop of the master pressure is suppressed by the absorbing section 9, it is possible to enhance the controllability in increasing the wheel pressure and, at the same time, to suppress the lowering in the reaction force to the brake operating member.

Further, when the driver keeps the operating force on the brake operating member, the brake fluid quantity in the master chambers 2A tends to decrease, thereby increasing the stroke amount of the brake pedal 1. However, in the present embodiment, because the decrease of the brake fluid quantity in the master chambers is suppressed by the absorbing section 9, it is possible to suppress an increase in the aforementioned stroke amount.

The elastic modulus of the elastic deformation member 91 in the absorbing section 9 is set taking into account the states that arise before and after the pumping-back by which the brake fluid quantity flowing into and from the master chambers 2A becomes large. Assuming that the master pressure and the wheel pressure before the pumping-back are taken as P1, that the master pressure and the wheel pressure after the pumping-back are taken respectively as P2 and P3, that the spring characteristic of the master chambers 2A (a value representing the relation between the master pressure and the received fluid quantity in the master chambers 2A where the absorbing section 9 is not provided) is taken as km, that the spring characteristic of the wheel cylinders 4 (a value representing the relation between the wheel pressure and the received fluid quantity in the wheel cylinders 4) is taken as kw, and that the spring characteristic in the absorbing section 9 (a value representing the relation between the master pressure and the received fluid quantity in the master chambers where the received fluid quantity in the master chambers is assumed not to change even if the master pressure changes) is taken as ka, the expression $P1 \times (km+ka+kw) = P2 \times (km+ka) + P3 \times kw$ holds true because the fluid quantity does not change before and after the pumping-back.

When the pumping-back is carried out with the valve devices 51 operated, the fluid quantity outflowing from the master chambers 2A becomes (P1−P2) (km+ka), the inflowing fluid quantity becomes (P3−P1) kw, the fluid quantity $\Delta Q$ outflowing from the master chambers 2A becomes $\Delta Q = (P1-P2)(km+ka) - (P3-P1)kw$, and the drop $\Delta P$ of the master pressure (base hydraulic pressure) caused by the fluid quantity $\Delta P$ becomes $\Delta P = \Delta Q/(km+ka)$. The spring characteristic ka is set so that the reduction of an actual brake force caused by a drop $\Delta P$ of the wheel pressure brought about by the drop $\Delta P$ of the base hydraulic pressure becomes equal or less than a tolerable value relative to the target brake force that is generated by the wheel pressure P3 appearing after the pumping-back. Further, the elastic modulus of the elastic deformation member 91 in the absorbing section 9 is set based on the spring characteristic ka and the pressure receiving area of the master piston 21.

The elastic modulus of the elastic deformation member 91 that determines the spring characteristic ka of the absorbing section 9 is set so that the separation area 93 is not exhausted even if the force depending on the master pressure (for example, being lower than 2 MPa) acts on the elastic deformation member 91 in the usual braking operation (the operation except for a quick brake). The usual braking operation means the operation that brings the deceleration into a range of, for example, about 0.2 G to 0.3 G. The elastic modulus of the elastic deformation member 91 is set so that the elastic deformation member 91 is able to be adapted to a deceleration (0.5 G or so) exceeding the range.

In the first embodiment, the master chambers 2A correspond to accumulation chamber, and the absorbing section 9, the first master piston 21, the second master piston 22 and the master chambers 2A correspond to accumulation section which is arranged between the valve devices 51 and the booster device 3 and which forms the accumulation chamber accumulating the brake fluid. Then, the characteristic representing the relation between the hydraulic pressure and the fluid quantity of the brake fluid in the accumulation chamber is set so that the difference between the target brake force and the actual brake force when the pumps 54 and the valve devices 51 are in operation becomes equal to or less than a tolerable value.

Further, in the vehicle brake device 1, there is set a dead band that when the change of the hydraulic pressure in the master chambers 2A acting on the master pistons 21, 22 is less than a predetermined value, makes the change of the operating force F relative to the change of the hydraulic pressure in the master chambers 2A not act substantially on the brake operating member 1. That is, the dead band is set structurally so that even if the master pressure changes through $\Delta P$, the operating force F acting on the brake pedal 1 does not substantially change or changes a little. Then, a setting is made so that the difference (P1−P2) between the master pressure P2 after the pumping-back and the master pressure P1 before the pumping-back falls within the pressure change (a critical pressure change amount of the dead band) for which the dead band is effective. In the present embodiment, the degree of the dead band is set taking into account the resistance difference in movement of the output member 32 in the forward and backward directions, the sliding resistance of the master pistons 21 and 22, the friction resistance between the large-diameter portion 32a of the output rod 32 and the large diameter hole 331d of the boost piston 331, the lap length of the spool valve 332, the hardness of the reaction force application member Y, and the like.

Like this, the spring characteristic ka representing the relation between the hydraulic pressure and the fluid quantity of the brake fluid in the accumulation chamber (master chambers 2A) of the accumulation section which is composed of the absorbing section 9, the first and second master pistons 21, 22 and the master chambers 2A is set based on the spring characteristic kw, representing the relation between the hydraulic pressure and the fluid quantity of the brake fluid in the wheel cylinders 4, and the dead band so that when the brake fluid is flowing into or from the master chambers 2A, the change of the operating force F relative to the change of the hydraulic pressure in the master chambers 2A acting on the first and second master pistons 21, 22 does not act on the brake pedal 1.

As described above, according to the present embodiment, when the hydraulic control device 5 adds a controlled hydraulic pressure to the wheel cylinders 4 or changes the controlled hydraulic pressure with the master pressure (base hydraulic pressure) supplied from the master chambers 2A to the wheel cylinders 4, the fluctuation in the master pressure can be suppressed. Therefore, it is possible to reliably control the wheel pressure to a desired hydraulic pressure and also to suppress the fluctuation in the reaction force to the brake manipulation member, so that the braking operationality by the driver can be improved.

Second Embodiment

Figure 3:
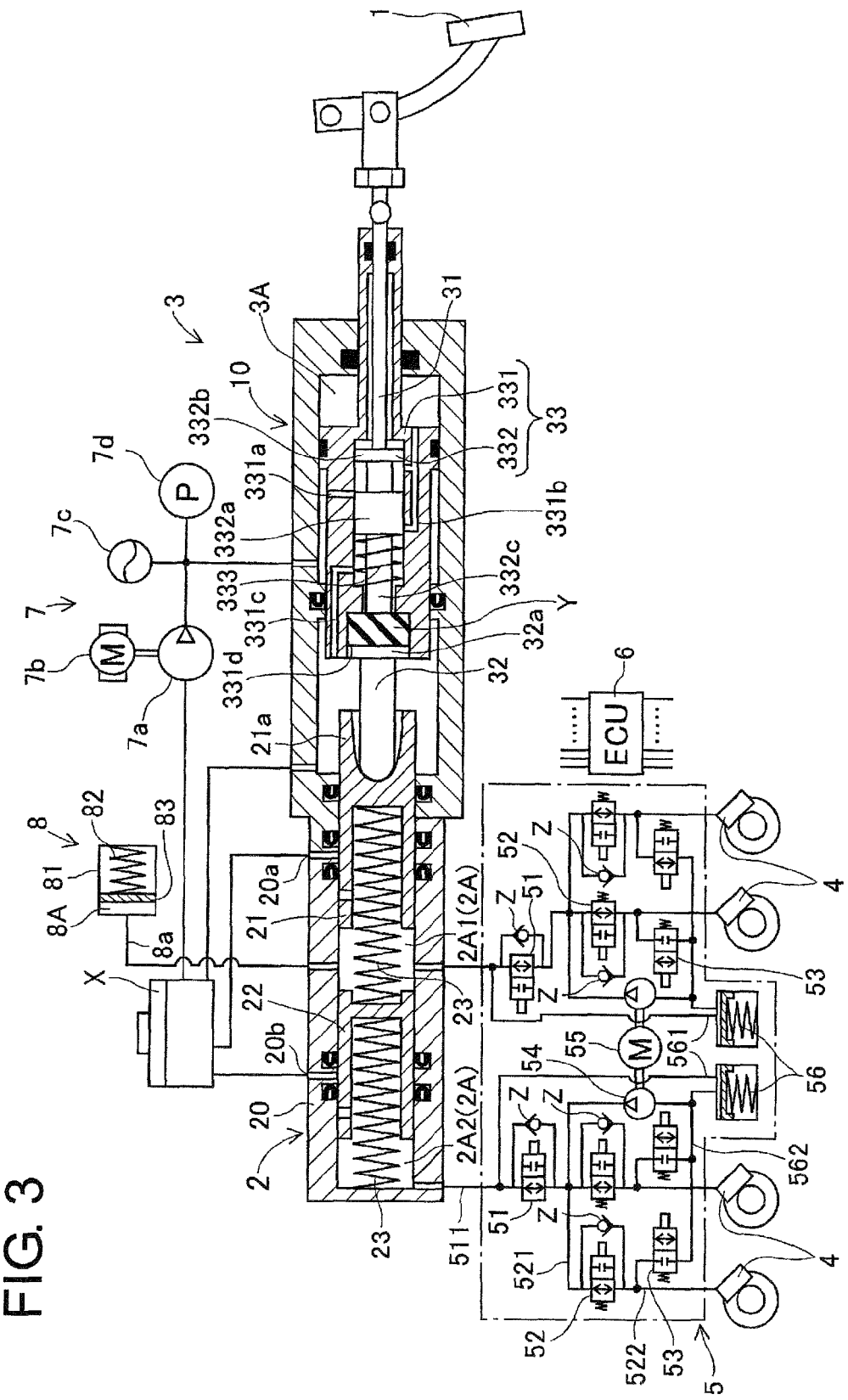
FIG. 3 is an explanatory view partly in section showing the construction of a vehicle brake device in a second embodiment.

As shown in FIG. 3, a vehicle brake device in a second embodiment differs from that in the first embodiment, is not provided with the absorbing section 9 and is provided with an accumulation section 8 that is the same in function as the absorbing section 9. Other constructions are the same as those in the first embodiment and thus, will be omitted from description. In the second embodiment, there is taken a construction that the output member 32 and the first master piston 21 are connected (directly) without an intervention of the absorbing section 9.

The accumulation section 8 is arranged outside the booster housing 10 and the master cylinder 20 and between the valve devices 51 and the booster device 3. The accumulation section 8 is formed with an accumulation chamber 8A accumulating brake fluid therein. The accumulation section 8 is in communication with the first master chamber 2A1 through a pipe (corresponding to "flow passage forming portion") 8a. Specifically, the accumulation section 8 is provided with a cylinder portion 81, an elastic deformation member 82 and a sliding piston 83 urged by the elastic deformation member 82 toward the pipe 8a side. The accumulation chamber 8A is defined by a portion on the pipe 8a side of the cylinder portion 81 and the sliding piston 83. A spring is used as the elastic deformation member 82. When brake fluid flows into the cylinder portion 81, the sliding piston 83 is slid toward the side going away from the pipe 8a against the urging force of the elastic deformation member 82 to absorb brake fluid. The elastic deformation member 82 is compressed by being pushed by the sliding piston 83 as a result of brake fluid flowing into the cylinder portion 81. On the contrary, when brake fluid is supplied from the master chambers 2A to the wheel cylinders 4, the elastic deformation member 82 stretches to return from the compressed state to the initial state, and thus, the sliding piston 83 is slid by being be pushed toward the accumulation chamber 8A side, whereby the brake fluid in the accumulation chamber 8A flows into the master chamber 2A through the pipe 8a. That is, the accumulated brake fluid is supplied from the accumulation chamber 8A to the wheel cylinders 4 through the master chamber 2A.

The elastic modulus of the elastic deformation member 82 in the accumulation section 8 is set taking into account the states that arise before and after the pumping-back in which the brake fluid quantity flowing into and from the master chambers 2A becomes large. Assuming that the master pressure and the wheel pressure before the pumping-back are taken as P1, that the master pressure and the wheel pressure after the pumping-back are taken respectively as P2 and P3, that the spring characteristic of the master chamber 2A (the value representing the relation between the master pressure and the received fluid quantity of the master chamber 2A) is taken as km, that the spring characteristic of the wheel cylinders 4 (the value representing the relation between the wheel pressure and the received fluid quantity of the wheel cylinders 4) is taken as kw, and that the spring characteristic of the accumulation section 8 (the value representing the relation between the master pressure and the received fluid quantity of the accumulation chamber 8A) is taken as ka, the expression P1×(km+ka+kw)=P2×(km+ka)+P3×kw holds true because fluid quantity does not change before and after the pumping-back. Accordingly, the spring characteristic ka in the accumulation section 8 can be set to be the same as that in the first embodiment, and the elastic modulus of the elastic deformation member 82 in the accumulation section 8 is set based on the spring characteristic ka and the pressure receiving area of the sliding piston 83.

Also with this construction, the same effects as those in the first embodiment can be achieved. Further, in the second embodiment, since the accumulation section 8 is arranged outside the master cylinder 20, it is possible to shorten the length of the hydraulic pressure generating device 2. As far as the accumulation section 8 is between the valve devices 51 and the booster device 3, it may be arranged either inside or outside the booster housing 10 and the master cylinder 20. Further, the accumulation section 8 may be connected to the second master chamber 2A2.

Further, as referred to later, a throttle portion (84) may be provided on the passage (pipe) 8a that connects the accumulation section 8 with the master chamber 2A (refer to FIG. 6). Suppressing the rapid flow of the brake fluid through the pipe 8a by the throttle portion is preferable because the brake fluid in the master chamber 2A is restrained from flowing into the accumulation chamber 8A when the brake pedal 1 is stepped. For example, an orifice or a choke is applicable as the throttling portion. Further, as the throttling portion, it is possible to use a valve being controllable by the brake ECU 6, in which case the opening degree of the valve can be adjusted/controlled to such an opening degree that functions as the throttle portion (throttling mechanism). Furthermore, a valve may be provided on the flow passage 8a, and the opening/closing of the valve may be controlled by the brake ECU 6. Furthermore, within the dead band, the "substantial operation" does not occur if the reaction force to the stepping force is less than the tolerable value.

Third Embodiment

A vehicle brake device in a third embodiment is designed to set the boosting ratio of the booster device 3 in the first and second embodiments. That is, in the booster device 3, the relation between the pressure Pm in the master chamber 2A and the operating force F acting on the input rod 31 is represented by "Pm=(F/Am)*(Ao/Ar)" as aforementioned. Herein, Am denotes the area of the master chamber 2A, As denotes the area of the assist chamber 3A, Ar denotes the area at the small-diameter portion 332c of the spool valve 332, and Ao denotes the area at the large-diameter portion 32a of the output member 32. Thus, because the operating fluid is incompressible, a fluctuation ΔPm in the pressure Pm of the master chamber 2A causes the pressure of the assist chamber 3A to fluctuate by ΔPm*Am/As, and hence, the pressure acting on the reaction force application member Y fluctuates in proportion to the pressure fluctuation ΔPm in the master chamber 2A. Thus, a fluctuation ΔF in the operating force F acting on the input rod 31 becomes ΔF=ΔPm*Am*Ar/Ao. Since the boosting rate K of the booster device 3 is K=Ao/(Am*Ar), the larger the boosting ratio K is made to be, the smaller the fluctuation ΔF/ΔPm=1/K in the operating force to the pressure fluctuation ΔPm in the master chamber 2A can be made to be.

Figure 4:
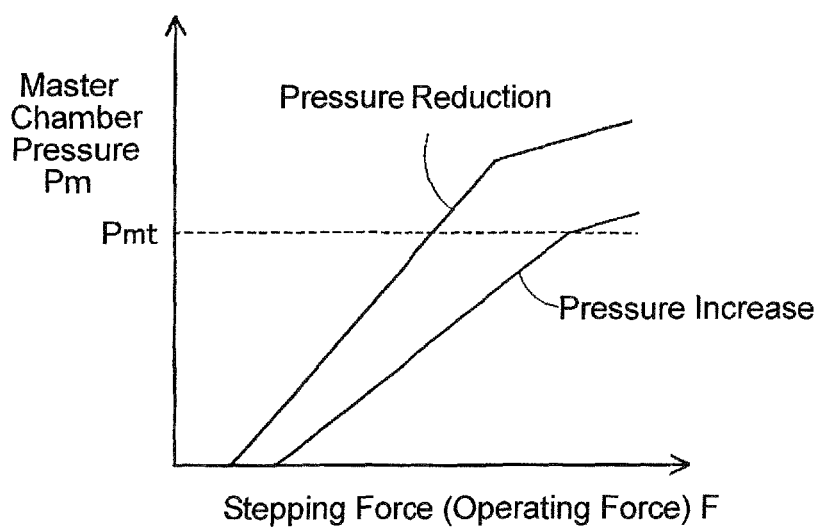
FIG. 4 is an explanatory graph for explaining a dead band.

As shown in FIG. 4, the dead band of the booster device 3 is set in such a manner that the change in the operating force on the brake pedal 1 relative to the change in the hydraulic pressure in the master chamber 2A is made to be smaller when the hydraulic pressure in the master pressure 2A is less than a predetermined pressure Pmt, in comparison with that when the hydraulic pressure in the master chamber 2A is equal or higher than the predetermined pressure Pmt. Accordingly, the dead band is set within a range that the hydraulic pressure in the master chamber 2A is less than the predetermined pressure Pmt. Like this, by making the boosting ratio of the booster device 3 when the hydraulic pressure of the master pressure is less than the predetermined pressure larger in comparison with that when the hydraulic pressure of the master pressure is equal to or higher than the predetermined pressure, the dead band is set within the range that the hydraulic pressure in the master chamber 2A is less than the predetermined pressure.

Fourth Embodiment

Figure 5:
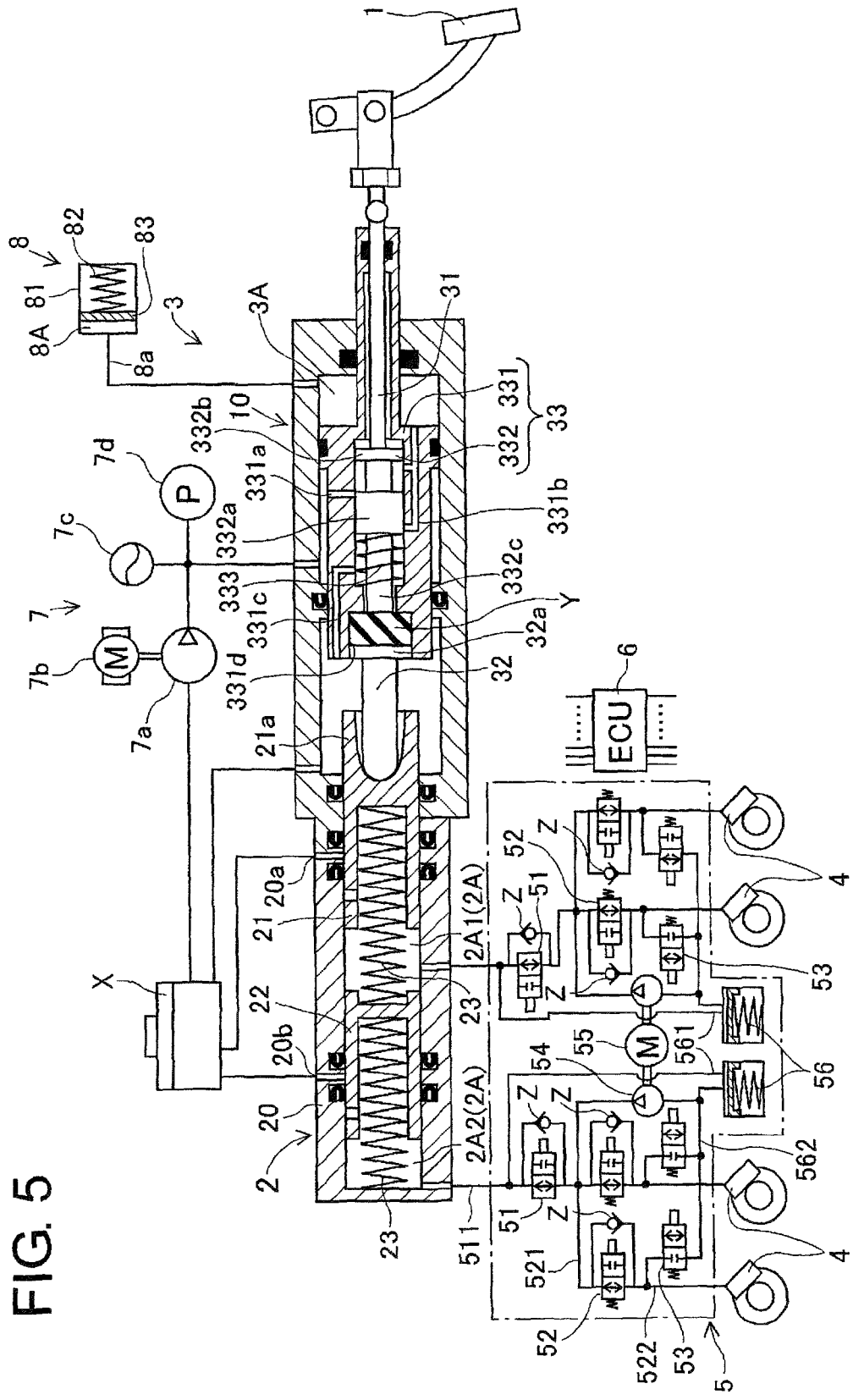
FIG. 5 is an explanatory view partly in section showing the construction of a vehicle brake device in a fourth embodiment.

A vehicle brake device in a fourth embodiment differs from that in the second embodiment in that as shown in FIG. 5, the accumulation section 8 in the second embodiment is provided to communicate not with the master chamber 2A but with the assist chamber 3A. Hereinafter, description will mainly be made regarding those portions that differ from the second embodiment.

The accumulation section 8 in the fourth embodiment is connected to the assist chamber 3A. Like that in the second embodiment, the accumulation section 8 has a cylinder portion 81, an elastic deformation member 82, a sliding piston 83 and a pipe 8a (corresponding to "flow passage forming portion"). Differently from the second embodiment, the pipe 8a is a pipe that is connected to the booster housing 10 at one end and to the cylinder portion 81 at the other end, and forms a flow passage making the assist chamber 3A and the accumulation chamber 8A in communication. The accumulation chamber 8A is in communication with the assist chamber 3A through the pipe 8a.

An oil consumption gradient of the accumulation section 8 will be described. The oil consumption gradient of the accumulation section 8 represents the brake fluid absorbing quantity by the accumulation section 8 relative to the pressure change in the assist chamber 3A to which the pipe 8a is connected. The oil consumption gradient of the accumulation section 8 fluctuates in dependence on an elastic modulus being set of the elastic deformation member 82.

In the present embodiment, the oil consumption gradient of the accumulation section 8 is determined based on a tolerable value (master chamber tolerable pressure change) relative to the pressure change in the master chamber 2A that takes place at the time of a regeneration substitution, and a tolerable stroke amount (tolerable pedal stroke fluctuation) of the stroke through which the brake pedal 1 is pushed back on the assumption that the stepping force is fixed.

The regeneration substitution means a control in which the brake fluid is positively moved between the master cylinder 20 and the wheel cylinders 4 by the driving of the hydraulic control device 5. Specifically, the regeneration substitution is a control in which in order to hold the actual brake force (regenerative brake force+hydraulic brake force) within a tolerable range for the target brake force when the operating amount on the braking pedal 1 is fixed as is the case of the first embodiment, the hydraulic brake force is lowered as a result of lowering the wheel pressure by returning the braking fluid in the wheel cylinders 4 to the master cylinder 20 by the valve devices 51, the pumps 5 and the like or is increased as a result of raising the wheel pressure by supplying the brake fluid from the master cylinder 20 to the wheel cylinders 4.

The oil consumption gradient and the master chamber pressure change are in a relation of being in inverse proportion, while the oil consumption gradient and the pedal stroke fluctuation are in a relation of being in proportion. The oil consumption gradient of the accumulation section 8 is set to satisfy the both fluctuation amounts. That is, the oil consumption gradient of the accumulation section 8 is set so that the master pressure fluctuation at the time of the regeneration substitution falls within a tolerable value and so that the stroke amount by which the brake pedal 1 is pushed backed falls within a tolerable value. The elastic modulus of the elastic deformation member 82 has been set to attain the aforementioned oil consumption gradient through experiments, calculations (simulations) or the like. The master chamber tolerable pressure change and the tolerable pedal stroke fluctuation are set for each vehicle for example.

Further, a maximum consumption pressure of the accumulation section 8 is set to be less than a predetermined pressure (herein, the maximum operating pressure at the time of the regeneration substitution). That is, the accumulation section 8 is a damper that operates at a pressure being less than the predetermined pressure. The damper size (capacity) of the accumulation section 8 can be set taking into account the area ratio of the pressure receiving area on the backward side of the master chambers 2A to the pressure receiving area on the forward side of the assist chamber 3A. As described above, the setting of the accumulation section 8 is preferable to be made like the setting in the fourth embodiment.

According to the present embodiment, when the brake fluid is moved from the wheel cylinders 4 to the master cylinder 20 in order to reduce the hydraulic brake force, the master pressure is raised to pressure the first master piston 21, the output member 32, the pressure regulating section 33 and the input rod 31 toward the backward side, and thus, the assist chamber 3A is pressurized. The pressuring on the pressure regulating section 33 causes the pressure in the assist chamber 3A to increase. In the present embodiment, the accumulation chamber 8A of the accumulation section 8 is in communication with the assist chamber 3A, and thus, when the pressure in the assist chamber 3A exceeds the urging force of the elastic deformation member 82, the brake fluid in the assist chamber 3A pushes the sliding piston 83 to flow into the accumulation section 8A.

Thus, the pressure increase in the assist chamber 3A is suppressed, whereby the pressure fluctuation in the master chamber 2A is suppressed to fall within the tolerable value. Further, the brake fluid flows from the wheel cylinders 4 to the master cylinder 20 to lower the wheel pressure, and thus, the hydraulic brake force is lowered based on the target. However, the pressuring on the pressure regulating section 33 causes the brake fluid in the assist chamber 3A to flow into the accumulation chamber 8A, and the capacity of the assist chamber 3A is decreased to retract the pressure regulating section 33 and the input rod 31, whereby the brake pedal 1 under the fixed stepping force is slightly pushed back. The oil consumption gradient of the accumulation section 8 is set so that the stroke amount by which the brake pedal 1 is pushed back at the time of the regeneration substitution falls within the tolerable pedal stroke fluctuation. Accordingly, it is possible to suppress the influence on the brake feeling to the minimum.

Further, in the present embodiment, the accumulation section 8 is provided for the assist chamber 3A, and thus, it is possible for the accumulation section 8 to absorb and mitigate the shock that occurs when the supply of the brake fluid from the hydraulic pressure source 7 to the assist chamber 3A is started or stopped. The shock occurs when the brake fluid enters the assist chamber 3A at once or when the stopping of the supply is done at once as the water hammer phenomenon takes place. According to the present embodiment, it is possible to mitigate the leading shock of the brake fluid, the shock due to the supply stopping and the shock noise, whereby the brake feeling can be improved.

Further, the accumulation section 8 in the present embodiment does not directly absorb the fluctuation in the master pressure unlike that in the second embodiment, and thus, when the brake pedal 1 is quickly stepped as is the case of, for example, a quick braking, the absorbing of the brake fluid by the accumulation section 8 does not result in increasing the stroke amount of the first master piston 21. That is, in the present embodiment, it is possible to restrain the stroke amount of the first master piston 21 from increasing due to the absorbing of the brake fluid by the accumulation section 8. Accordingly, the present embodiment is considered to be superior to the second embodiment in terms of the responsiveness to the braking operation.

Fifth Embodiment

Figure 6:
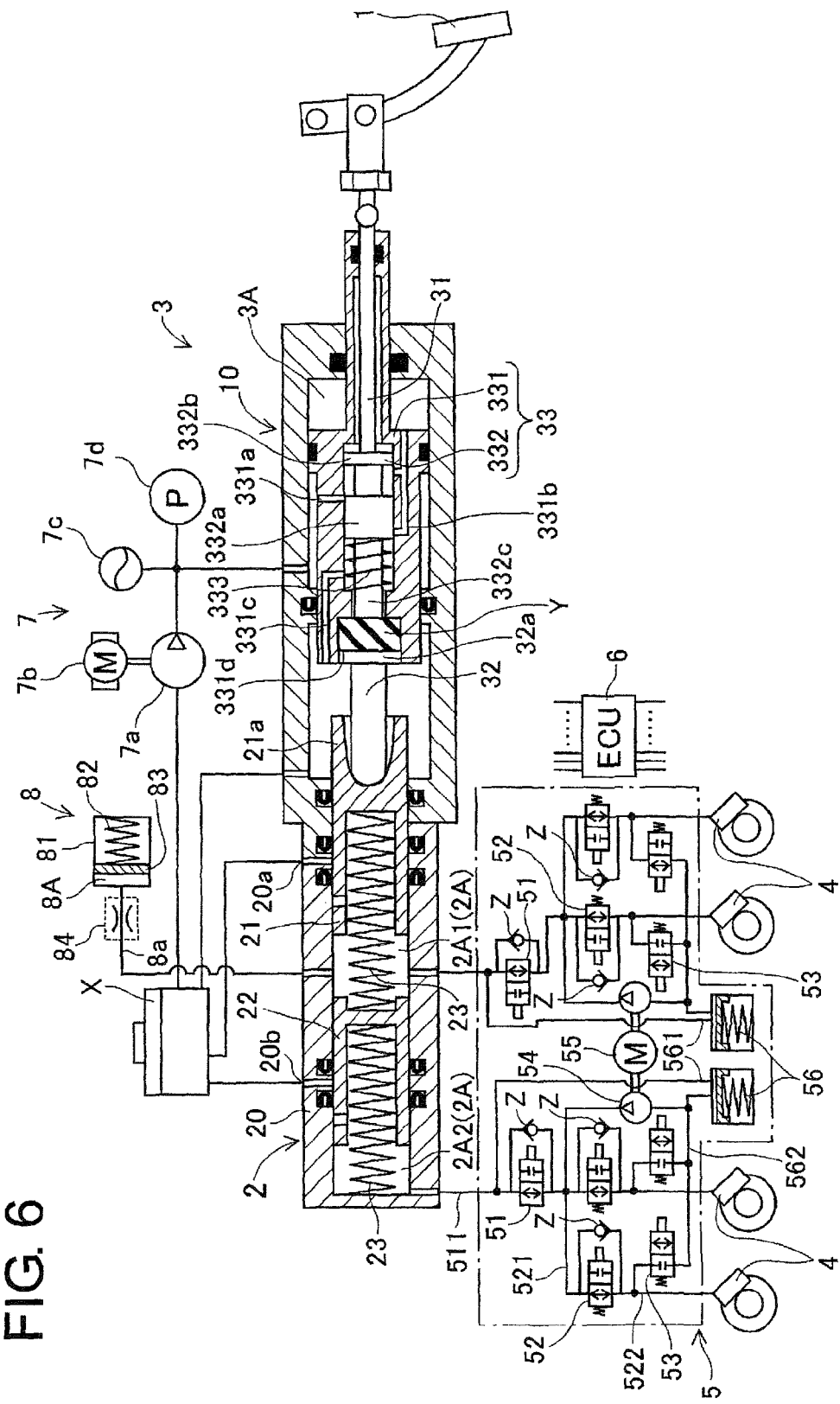
FIG. 6 is an explanatory view partly in section showing the construction of a vehicle brake device in a fifth embodiment.

As shown in FIG. 6, a vehicle brake device in a fifth embodiment differs from that in the second embodiment in a point that a throttle portion 84 is provided for the pipe 8a in the second embodiment. Hereinafter, description will be mainly made regarding different portions from the second embodiment.

In the fifth embodiment, the throttle portion 84 is provided on the pipe 8a that connects the accumulation section 8 with the master cylinder 20 to make the accumulation chamber 8A communicate with the first master chamber 2A1. That is, the accumulation section 8 is provided with the cylinder portion 81, the elastic deformation member 82, the sliding piston 83, the pipe 8a and the throttle portion 84. The throttle portion 84 is a throttling mechanism and performs a function of suppressing the rapid flow of the fluid in the pipe 8a.

According to the present embodiment, when the master piston 21 is quickly advanced at the time like a quick stepping of the brake pedal 1, the throttle portion 84 suppresses the rapid flow of the brake fluid from the first master chamber 2A1 to the accumulation chamber 8A, and hence, the master pressure can be increased without a loss to raise the wheel pressure. That is, according to the present embodiment, it is possible to suppress the degradation in the braking responsiveness.

Further, according to the present embodiment, since, in the case such as the time of the regeneration substitution, the brake fluid is moved comparatively slowly, the throttle portion 84 is hard to operate, and the brake fluid flows through the pipe 8a, so that the accumulation section 8 can be made to function. Like this, according to the present embodiment, the throttling effect by the throttle portion 84 is small at the flow speed made at the time of the regeneration substitution to suppress the influence on the controllability of the wheel pressure, whereas the throttling effect by the throttle portion 84 is larger at a high flow speed made at the time of the quick stepping to suppress the oil consumption from the master chamber 2A, so that it is possible to obtain a preferred braking responsiveness.

It is preferable that the throttle portion 84 is set to be equal to or larger than a throttling diameter capable of securing a flow rate per unit time required at the time of the regeneration substitution and to be equal or smaller than a throttling diameter capable of confining the increase amount in stroke of the brake pedal 1 at the time of the quick stepping within a tolerable amount. The throttling amount of the throttle portion 84 in the present embodiment is set as described above.

Sixth Embodiment

Figure 7:
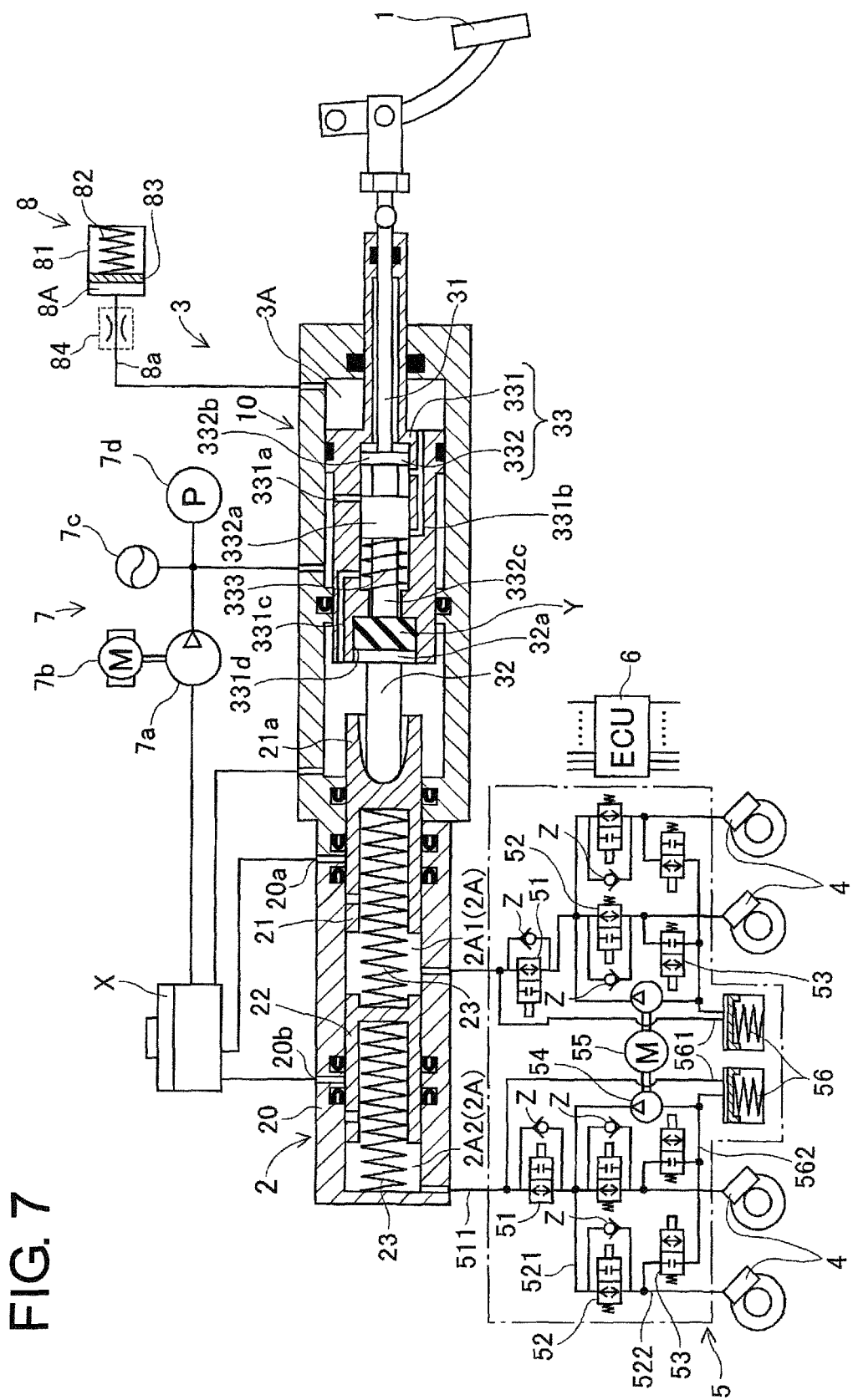
FIG. 7 is an explanatory view partly in section showing the construction of a vehicle brake device in a sixth embodiment.

As shown in FIG. 7, a vehicle brake device in a sixth embodiment differs from that in the fourth embodiment in that a throttle portion 84 is provided for the pipe 8a in the fourth embodiment. Hereinafter, description will mainly be made regarding different portions from the fourth embodiment.

In the sixth embodiment, the throttle portion 84 is provided on the pipe 8a that connects the accumulation section 8 with the booster housing 10 to make the accumulation chamber 8A communicate with the assist chamber 3A. That is, the accumulation section 8 is provided with the cylinder portion 81, the elastic deformation member 82, the sliding piston 83, the pipe 8a and the throttle portion 84. The throttle portion 84 is a throttling mechanism and performs a function of suppressing the rapid flow of the fluid in the pipe 8a.

It is preferable that the throttle portion 84 is set to be equal to or larger than a throttling diameter capable of securing a flow rate per unit time required at the time of the regeneration substitution and to be equal or smaller than a throttling diameter capable of confining the assist delay time at the time of the quick stepping within a tolerable time. The throttling amount of the throttle portion 84 in the present embodiment is set as described above.

According to the present embodiment, the same effects as those achieved in the fourth and the fifth embodiments can be achieved. According to the present embodiment, the throttling effect by the throttle portion 84 is small at the flow speed made at the time of the regeneration substitution to suppress the influence on the controllability of the wheel pressure, whereas the throttling effect by the throttle portion 84 is large at a high flow speed made at the time of the quick stepping to suppress an increase in the flow quantity required to be supplied to the assist chamber 3A, so that it is possible to obtain a preferred braking responsiveness.

Seventh Embodiment

Figure 8:
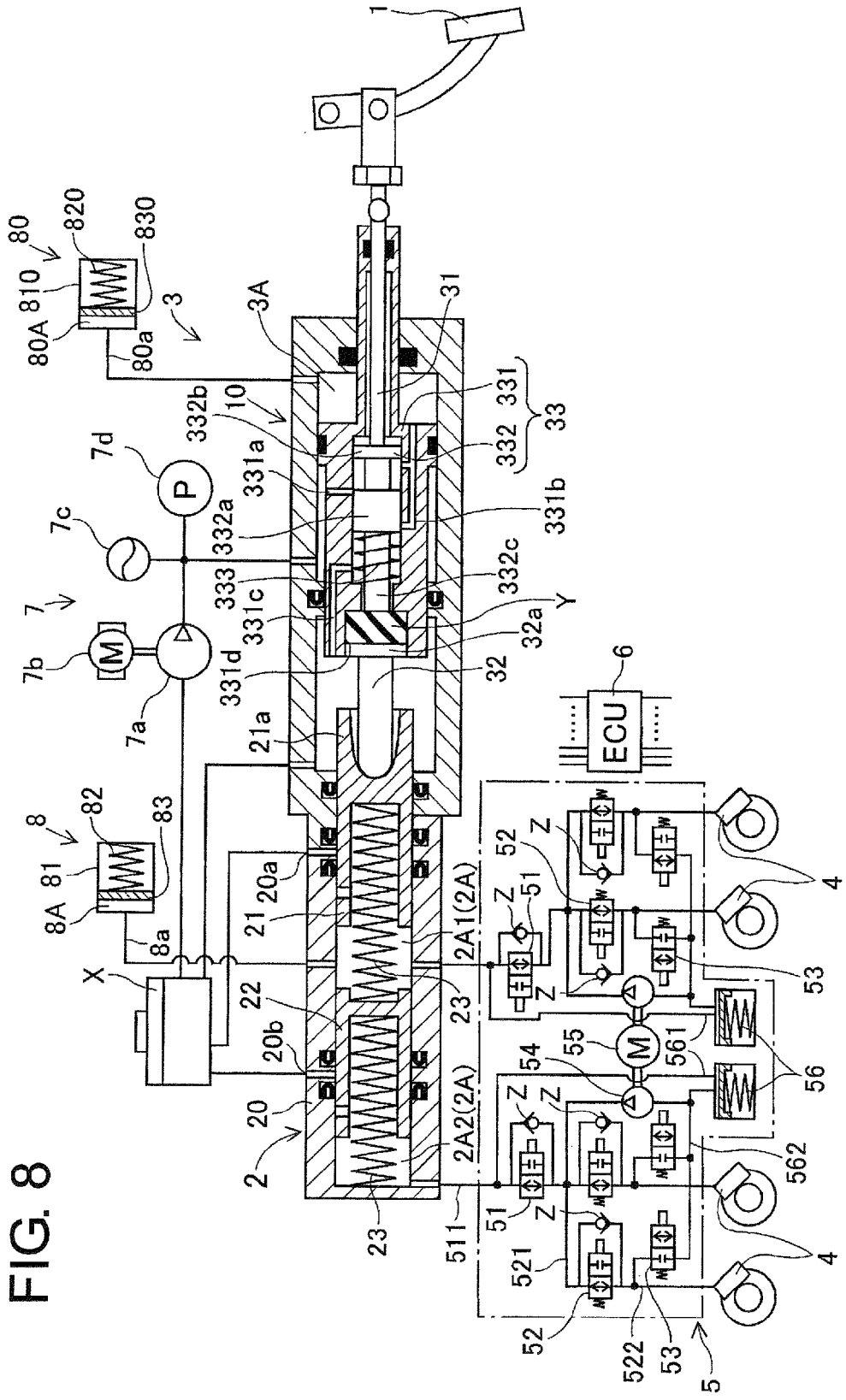
FIG. 8 is an explanatory view partly in section showing the construction of a vehicle brake device in a seventh embodiment.

As shown in FIG. 8, a vehicle brake device in a seventh embodiment differs from that in the second embodiment in that the accumulation section is provided not only for the master chamber 2A but also for the assist chamber 3A. Hereinafter, description will mainly be made regarding different portions from the second embodiment.

The vehicle brake device in the seventh embodiment is provided with the accumulation section 8 and an accumulation section 80. The accumulation section 80 takes the same construction as the accumulation section in the fourth embodiment. That is, the accumulation section 80 is provided with a cylinder portion 810, an elastic deformation member 820, a sliding piston 830 and a pipe 80a. The accumulation section 80 forms the accumulation chamber 80A as is the same in the fourth embodiment. Thus, the same effects as those achieved in the second and fourth embodiments can be achieved.

Furthermore, in the present embodiment, because the two accumulation sections 8 and 80 are provided, it is possible to adjust the total damper effect by changing the design of the accumulation section on one side. Thus, because the magnitude of the damper effect can be adjusted by the setting of the accumulation section 8 for example, the design of the accumulation section 80 having a shock absorbing effect can be made to be the same without being changed for vehicle by vehicle, and thus, vehicle brake devices can be manufactured so as to be equipped with the accumulation section 80 as a standard part. That is, the accumulation section 80 is not required to be changed for vehicle by vehicle, so that the manufacturing of the vehicle brake devices become facilitated as a whole.

Figure 9:
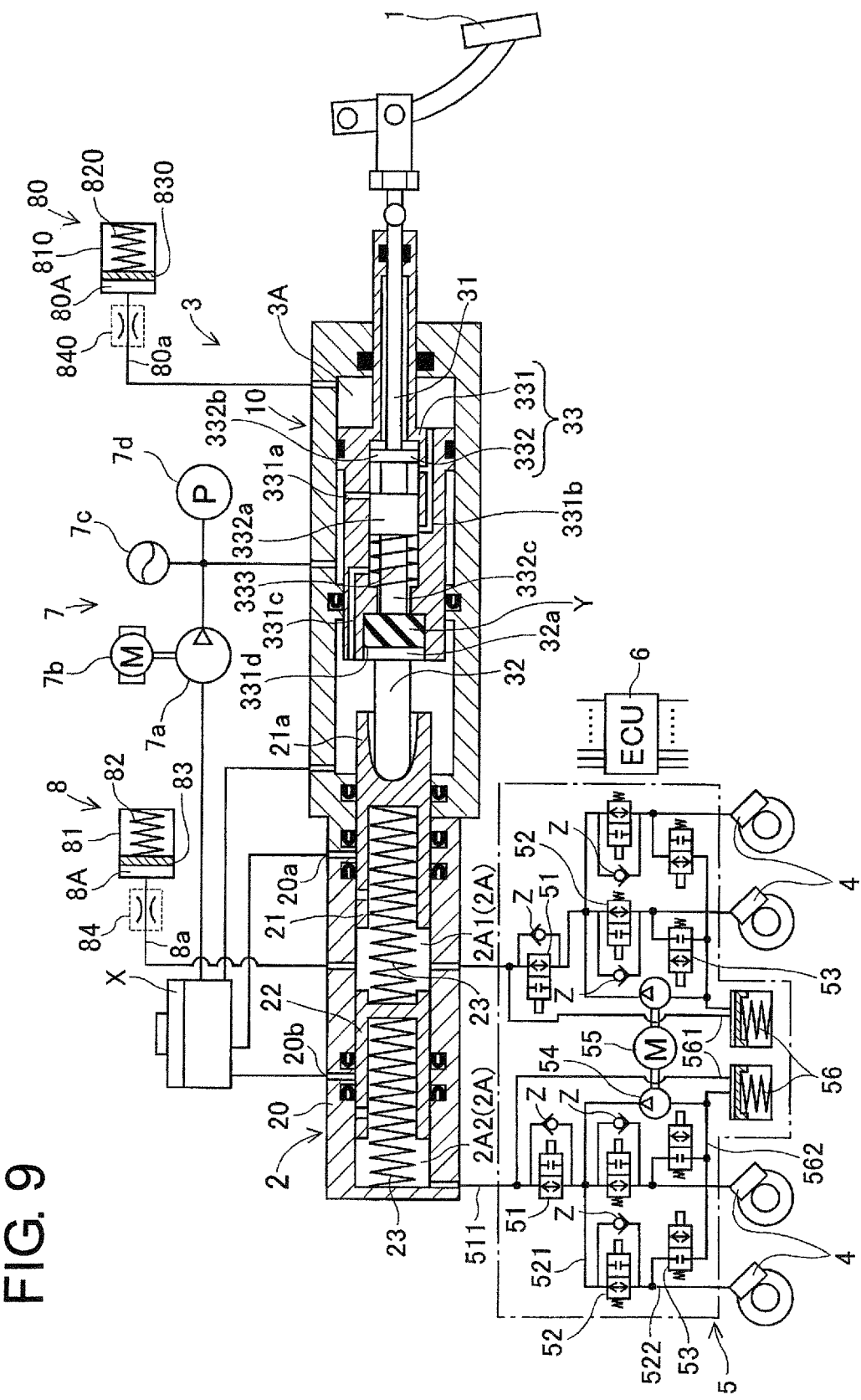
FIG. 9 is an explanatory view partly in section showing the construction of a vehicle brake device in a modified form of the seventh embodiment.

Further, as shown in FIG. 9, the both pipes 8a, 80a may be provided with throttle portions (84, 840) corresponding thereto. Thus, in addition to the aforementioned effects, the same effects as those achieved in the fifth and the sixth embodiments can be achieved. The throttle portion (84, 840) may be provided only for either one of the pipes 8a and 80a.

Others

Although in the foregoing first to seventh embodiments, the hydraulic booster is exemplified as the booster device 3, the vehicle brake device in the present invention may be provided with a vacuum booster as the booster device 3. Further, although in the foregoing first, second and fifth embodiments, the vehicle brake device is exemplified as having the booster device 3, the vehicle brake device in the present invention may not be provided with the booster device 3.

Figure 10:
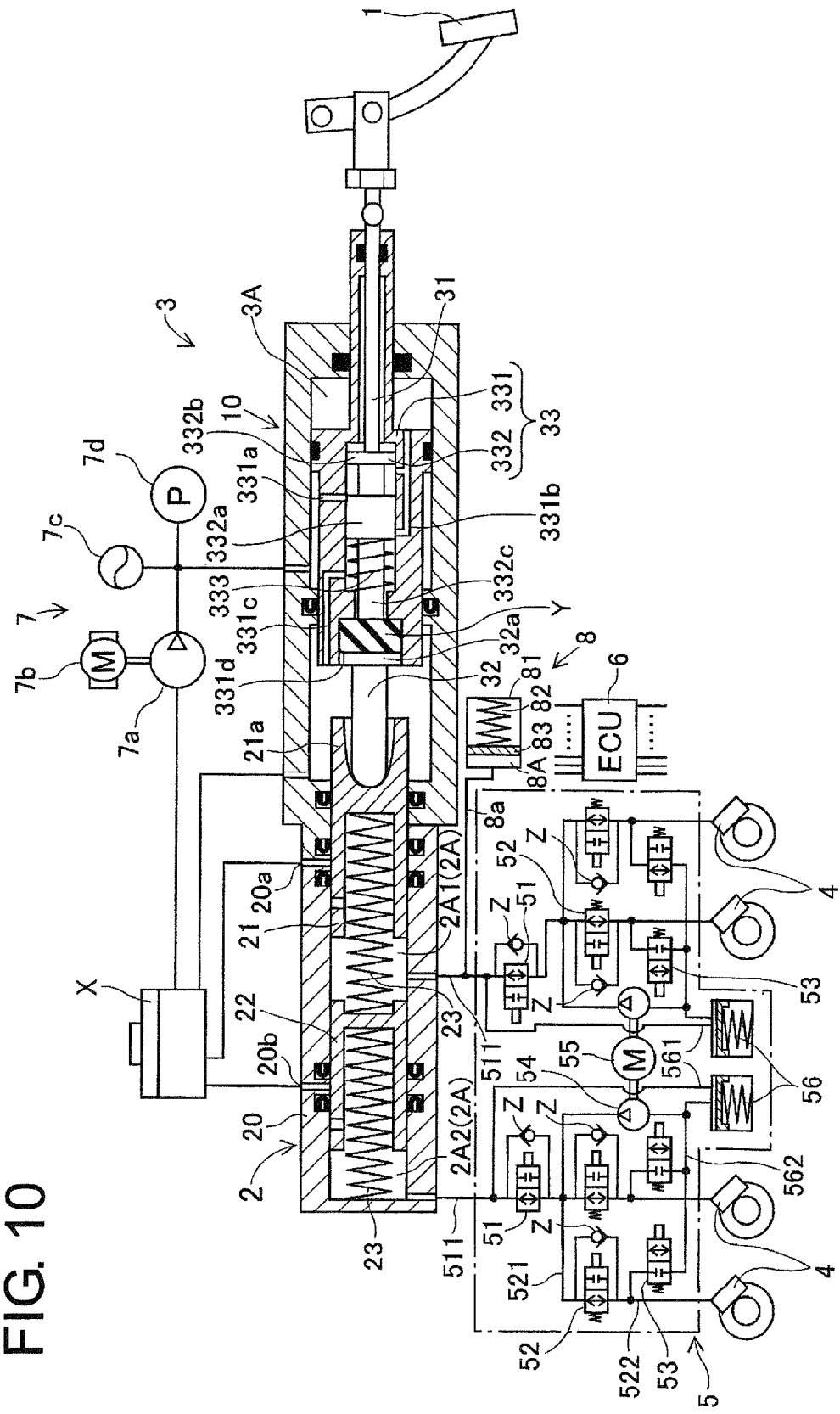
FIG. 10 is an explanatory view partly in section showing the construction of a vehicle brake device in another embodiment.

Further, the elastic deformation member 82, 820 is not limited to a spring and may be rubber for example. The accumulation sections 8, 80 may each configure a damper by using, for example, a bellows or a diaphragm as the elastic deformation member. Furthermore, as shown in FIG. 10, the accumulation section 8 may be provided between the master cylinder 20 and the valve device 51 (for the pipe 511 between the first master chamber 2A1 and the valve device 51 in the figure). By doing so, the same effects as those in the first embodiment can be achieved. Furthermore, in the fifth embodiment, the sixth embodiment and the modified form of the seventh embodiment, the throttle portion is directly provided on the passage (pipe) solely for the brake fluid. However, without being limited to the construction, the following construction is likewise able to achieve similar effects. That is, for example, there may be taken a construction that the fluid (e.g., air) on the side opposite to the accumulation chamber with respect to the sliding piston 83, the bellows or the diaphragm (on the side of the receiving chamber that receives the elastic deformation member 82, 820 of the cylinder portion 81, 810 in the embodiment) is given a resistance when flowing into or from the external (the outside of the aforementioned receiving chamber in the cylinder portion 81, 810 in the embodiment). With this construction, it is possible to suppress the flow speed of the brake fluid into and from the accumulation chamber 8A, 80A.

The invention claimed is:

1. A vehicle brake device comprising:
a hydraulic pressure generating device in which, with an operation on a brake operating member configured to apply a mechanical force to a master piston, said master piston is slid relative to a master cylinder to generate a hydraulic pressure corresponding to the operation on the brake operating member in a master chamber of said master cylinder;
a booster device that generates a fluid pressure corresponding to an operating force acting on the brake operating member in an assist chamber to apply a force corresponding to the fluid pressure in the assist chamber to the master piston;
a valve device that is provided on a flow passage for brake fluid between the hydraulic pressure generating device and a wheel cylinder and that controls the flow of brake fluid between the hydraulic pressure generating device and the wheel cylinder;
a pump that discharges the brake fluid on the hydraulic pressure generating device side with respect to the valve device toward the wheel cylinder side with respect to the valve device; and
an accumulation section that forms an accumulation chamber in communication with the assist chamber, a fluid consumption gradient of the accumulation section being set such that a pressure increase in the assist chamber is suppressed so that a stroke amount by which the brake operating member is pushed back falls within a predetermined stroke fluctuation when the brake fluid in the wheel cylinder is returned to the master cylinder to lower a wheel cylinder pressure;
wherein a dead band is set such that, when the hydraulic pressure in the master cylinder changes in a manner in which the change of the hydraulic pressure in the master chamber acting on the master piston is smaller than a predetermined value, the operating force on the brake operating member does not substantially change; and
wherein a characteristic representing the relation between the hydraulic pressure and the fluid quantity of the brake fluid in the accumulation chamber is set based on a characteristic representing the relation between the hydraulic pressure and the fluid quantity of the brake fluid in the wheel cylinder and the dead band so that, when the brake fluid is flowing into or from the accumulation chamber, the change of the hydraulic pressure in the master chamber is suppressed.

2. The vehicle brake device in claim 1, wherein the characteristic representing the relation between the hydraulic pressure and the fluid quantity of the brake fluid in the accumulation chamber is set based on a predetermined value for the difference between an actual brake force and a target brake force when the valve device is operated.

3. The vehicle brake device in claim 1, wherein
the accumulation section is constituted by a damper having an elastic deformation member.

4. The vehicle brake device in claim 1, wherein:
the accumulation section has a flow passage forming portion that forms a flow passage for brake fluid between the accumulation chamber and the assist chamber; and
a throttle portion is provided on the flow passage forming portion.

* * * * *